Patented Mar. 31, 1942

2,277,872

UNITED STATES PATENT OFFICE 2,277,872

PRODUCTS FROM TARTARIC ACID

Richard Pasternack, Brooklyn, and Ray Arthur Patelski, Kew Gardens, N. Y., assignors to Charles Pfizer & Company, Brooklyn, N. Y., a corporation of New Jersey No Drawing. Application February 9, 1940, Serial No. 318,102

5 Claims. (Cl. 260—484)

The object of this invention is the preparation of the acid chlorides of monoesters of completely acylated polyhydroxy carboxylic acids, and their reduction and saponification products including the corresponding uronic acids. Our process is of especial value in the preparation of the threuronic acids, which, in so far as we have been able to determine, have never before been made by any process.

A further object of the invention is the preparation of threonic acids and threonolactones in a commercially practicable way. Hitherto threonic acid and its derivatives have been prepared with difficulty and only from expensive materials; for example, by alkaline oxidation of arabinose, as in German Patent No. 620,248 (Spengler and Pfannenstiehl, 1934), or by potassium permanganate oxidation of ascorbic acid and subsequent purification of the crude product by distillation under high vacuum (Gätzi and Reichstein, Helv. Chim. Acta 20: 1298–1301 of 1937). The oxidation products were often mixtures difficult to separate, and yields of the desired products were poor.

Our process uses d- or l-tartaric acid, both of which are readily available, and gives almost theoretical yields throughout. By the successive steps of the process which we have devised, either tartaric acid is readily converted in good yield into an ester of the corresponding threuronic acid, threonic acid, or threonolactone. As an example we describe below the various steps in the preparation of l-threonolactone from d-tartaric acid.

The preparation of diacetyltartaric anhydride from tartaric acid was described, for example, by Wohl and Oesterlin (Ber. 34: 1144 of 1901), and is not a part of our invention. It is obvious to esterify this anhydride with the aliphatic alcohols, but the diesters are useless for our purpose. We have found, however, that if diacetyltartaric anhydride is refluxed with an anhydrous alcohol and a dry inert mutual solvent which is removable by distillation under vacuum (such as benzene or xylene) without the addition of any esterification catalyst, the monoester forms in almost quantitative yield. For use in the preparation of the acid chloride the resulting ester need not be isolated, but the solution should be distilled until free from alcohol.

It is known to convert carboxylic acids into the corresponding acid chlorides by the action of thionyl chloride, phosphorus pentachloride or phosphorus trichloride and chlorine, but in so far as we have been able to determine, this treatment has not been applied to carboxylic acids containing acyl and ester groups which might be split off by the reagent. We have found, however, that under our conditions using temperatures below 100° C. the substituents are not lost, and the product in each case is a moderately stable acid chloride of the ester of diacetyltartaric acid used. It may be isolated by crystallization, but is not sufficiently stable to be kept for long periods even under favorable conditions. The selection and amount of solvent are not critical, but xylene has been found very satisfactory, and in any case a sufficient volume should be present to form a clear solution at the temperature used.

The acid chlorides of the lower alcohol monoesters of the diacetyltartaric acids are next reduced by hydrogen according to the general methods of Rosenmund (Ber. 51: 585 of 1918) and Rosenmund and Zetzsche (Ber. 54: 425 and 638 of 1921) for the reduction of acid chlorides. In the complete absence of water, substantially theoretical yields of the corresponding esters of the diacetylthreuronic acids can be obtained. This part of our invention is illustrated by the reduction of the methyl ester of diacetyl-d-tartaric acid chloride by hydrogen using a palladized barium sulfate catalyst. Best results are obtained when small amounts of sulfurized quinoline and acetyl chloride are added to the reaction mixture. We have found that these latter substance materially assist the reaction, resulting in a substantially larger yield of readily crystallizable product.

Lower alcohol esters of the diacetylthreuonic acids are converted to lower alcohol esters of 2,3-diacetylthreonic acids by catalytic hydrogenation. The time required to effect this reduction varies with the pressure of hydrogen used, the catalyst, and the solvent. We have obtained very satisfactory reduction of the esters in dioxan solution at room temperature, using a Raney nickel catalyst and hydrogen at 120 atmospheres pressure.

Hydrolysis and subsequent dehydration of the hydrolized products under high vacuum convert the lower alcohol esters of the 2,3-diacetylthreonic acids to threonolactones. Dilute acid hydrolysis of the esters was found to be preferable to alkaline hydrolysis, but either method produced the desired results.

We illustrate our invention by the preparation of l-threonolactone from diacetyl-d-tartaric acid anhydride, but it will be evident that its optical antipode, d-threonolactone, can be prepared by the same series of chemical reactions from l-tartaric acid. Also, it is not intended that our invention be limited by the proportions of materials used in the examples, although almost theoretical yields are obtained by use of the procedures as given. The following is a structural illustration of the preparation of l-threonolactone from diacetyl-d-tartaric anhydride.

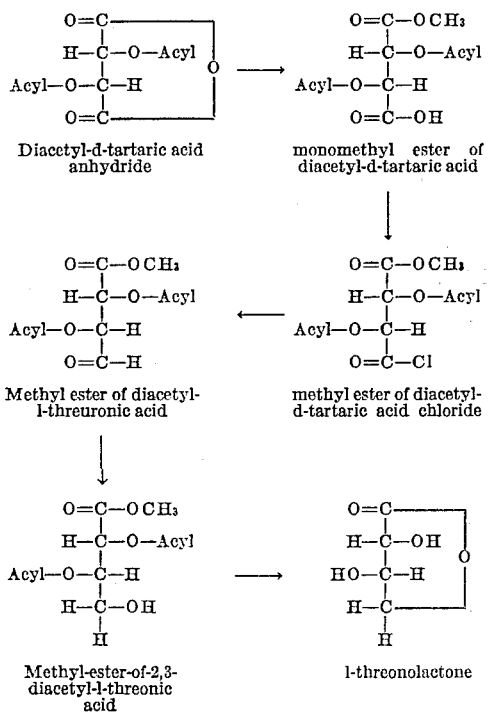

*Examples of steps of the process*

*Methyl ester of diacetyl-d-tartaric acid.*—A mixture of 216 grams of diacetyl-d-tartaric acid anhydride, 44 cc. of methanol and 250 cc. of dry xylene was refluxed on a steam bath for thirty minutes. The solvents were removed by distillation at subatmospheric pressure, and after recrystallization from acetone the colorless crystalline product melted at 125.5°-127° C. $[\alpha]^{20}_D=-20.2°$ (c, 5 in methanol); $[\alpha]^{20}_D=-21.1°$ (c, 5 in acetone). When the product is to be converted to the corresponding acid chloride, it need not be isolated, but the solution is distilled sufficiently to eliminate the methanol. Enough dry alcohol-free xylene is then added to make the total amount present about 300 cc.

*Acid chloride of the methyl ester of diacetyl-d-tartaric acid.*—209 grams (1 mole of 100%) phosphorus pentachloride was added to a suspension of 248 grams of the methyl ester of diacetyl-d-tartaric acid in 300 cc. of dry xylene and the mixture heated on a steam bath until reaction was complete. The solution was then distilled under subatmospheric pressure to remove phosphorus oxychloride. After recrystallization from xylene, the crystalline acid chloride melted at 108°-109° C. $[\alpha]^{20}_D=-37.8°$ (c, 6.4 in chloroform).

*Methyl ester of diacetyl-l-threuronic acid.*—A rapid stream of hydrogen was conducted into a well-stirred suspension of 75 g. of palladized barium sulfate (5% palladium-95% barium sulfate, prepared by precipitation of palladium on barium sulfate) contained in a solution of 266.5 g. of the methyl ester of d-tartaric acid chloride, 3 cc. of sulfurized quinoline (prepared by heating a mixture of 6 g. of sulfur with 35 g. of quinoline for 8 hours and then diluting the mixture with xylene to 250 cc.), 8 cc. of acetyl chloride and 600 cc. of dry xylene. The reaction mixture was maintained at 100°-110° until the evolution of hydrogen chloride had ceased (about 5 hours), the catalyst removed by filtration and the solution cooled. The crystalline product obtained was recrystallized from xylene and possessed a melting point of 86°-87° C. $[\alpha]^{20}_D=+27.5°$ (c, 1 in chloroform); $[\alpha]^{20}_D=-22.5°$ (c, 1 in acetone). It is readily saponified, but we have not been able to crystallize the deacetylated product.

*Methyl ester of 2,3-diacetyl-l-threonic acid.*—A mixture of 232 grams of the methyl ester of diacetyl-l-threuronic acid, 50 g. of Raney nickel and 600 cc. of dioxan was placed in a rocker, bomb-type hydrogenator and subjected to hydrogen at 120 atmospheres pressure. After 12 hours of reaction the catalyst was removed and the crystalline product which resulted when the solvent was evaporated at subatmospheric pressure was recrystallized from xylene; M. P., 79-81° C. $[\alpha]^{20}_D=-25.5°$ (c, 1 in methanol); $[\alpha]^{20}_D=-21.5°$ (c, 1 in acetone).

*l-threonolactone.*—A solution of 23.4 grams of the methyl ester of 2,3-diacetyl-l-threonic acid, 5 cc. of 50% sulfuric acid and 200 cc. of water was heated on a steam bath for 3 hours. The sulfuric acid was then removed with barium carbonate, the aqueous solution concentrated at subatmospheric pressure, and the sirupy residue which resulted was heated at 100°-105° C. under 0.5-1.0 mm. pressure for 2 hours. (While Gätzi and Reichstein produced threonolactone by distillation under high vacuum, dehydration under high vacuum gives much more satisfactory results, the product being of higher melting point and not contaminated with decomposition products.) The crystalline product which resulted after cooling the residue was washed with acetic acid and then with benzene; M. P., 74°-76° C. $[\alpha]^{20}_D=+47°$ (c, 1.5 in methanol).

We claim:

1. Process for the preparation of the methyl ester of diacetylthreuronic acid, comprising refluxing diacetyltartaric anhydride with anhydrous methanol in a water-free solvent selected from the group consisting of benzene, toluene and xylene; heating the resulting monomethyl ester in a sufficient amount of the alcohol-free solvent containing one mole of phosphorus pentachloride to permit complete solution at below 100° C.; removing the resulting phosphorus oxychloride by distillation; and reducing the resulting acid chloride in xylene solution by the action of hydrogen and a palladized barium sulfate catalyst in the presence of minor proportions of sulfurized quinoline and acetyl chloride.

2. In the preparation of diacetylthreuronic acid esters from anhydrides of the optically active diacetyltartaric acids, the step of reducing the acid chloride of the monomethyl ester of an optically active diacetyltartaric acid to form the methyl ester of the corresponding diacetylthreuronic acid by the action of hydrogen and a palladium catalyst.

3. As new products, the methyl esters of the optically active isomeric diacetylthreuronic acids.

4. Process for the preparation of aliphatic compounds of the formula

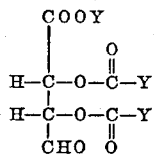

where Y is a lower alkyl group, comprising refluxing diacylated tartaric anhydride and an anhydrous lower aliphatic alcohol in a water-free inert mutual solvent distilling below 100° C. in a vacuum, to form the monoester; removing the excess alcohol by distillation; heating the monoester at below 100° C. to dissolve it in the alcohol-free solvent containing one mole of phosphorus pentachloride, to form the acid chloride of the ester; and reducing the acid chloride group to form the desired threuronic acid derivative.

5. Aliphatic compounds having the formula

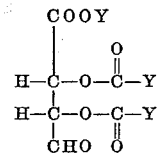

where Y is a lower alkyl group.

RICHARD PASTERNACK.
RAY ARTHUR PATELSKI.